Nov. 8, 1927.

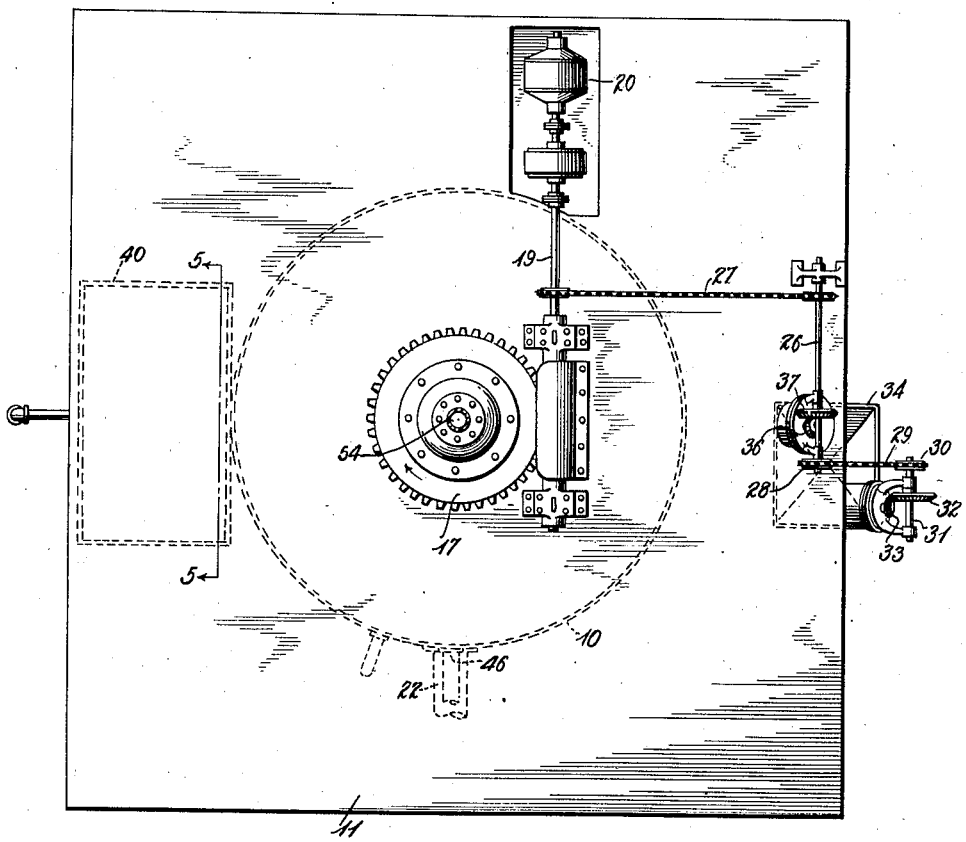
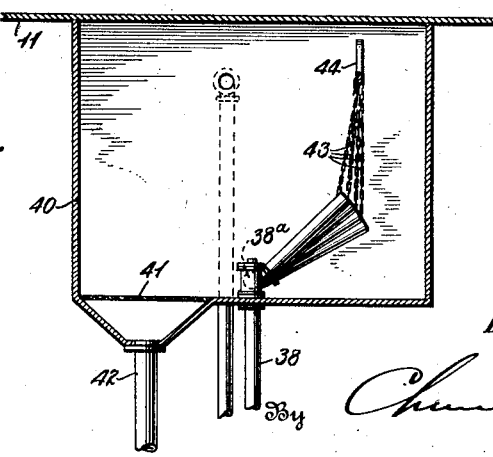

L. E. BROWN 1,648,607

SEPARATOR

Filed Nov. 13, 1926

Inventor
Laurence E. Brown
By
Attorneys

Patented Nov. 8, 1927.

1,648,607

UNITED STATES PATENT OFFICE.

LAURENCE E. BROWN, OF RIO DE JANEIRO, BRAZIL.

SEPARATOR.

Application filed November 13, 1926. Serial No. 148,280.

This invention relates to improvements in separators for clarifying liquids.

Broadly, the object of the present invention is to provide improved means for utilizing centrifugal and gravitational forces for separating both the heavier and the lighter solids from a liquid, leaving the solids in a concentrated form and the liquid clear and free thereof.

A further object is to provide a novel arrangement for removing the clarified liquid from the tank in which the separation of the foreign matter therein takes place.

A still further object consists in the provision of a novel arrangement for controlling the withdrawal of liquid from the separating tank in accordance with the supply of liquid or the level of the liquid which is maintained in the tank.

With these and other objects in view, the invention consists in certain novel details of construction and combinations and arrangements of parts all as will hereinafter be more fully described and the novel features thereof particularly pointed out in the appended claims.

In the accompanying drawings,—

Fig. 2 is a top plan view.

Fig. 5 is a longitudinal sectional view taken of the sump tank shown in Fig. 4.

Figure 1:
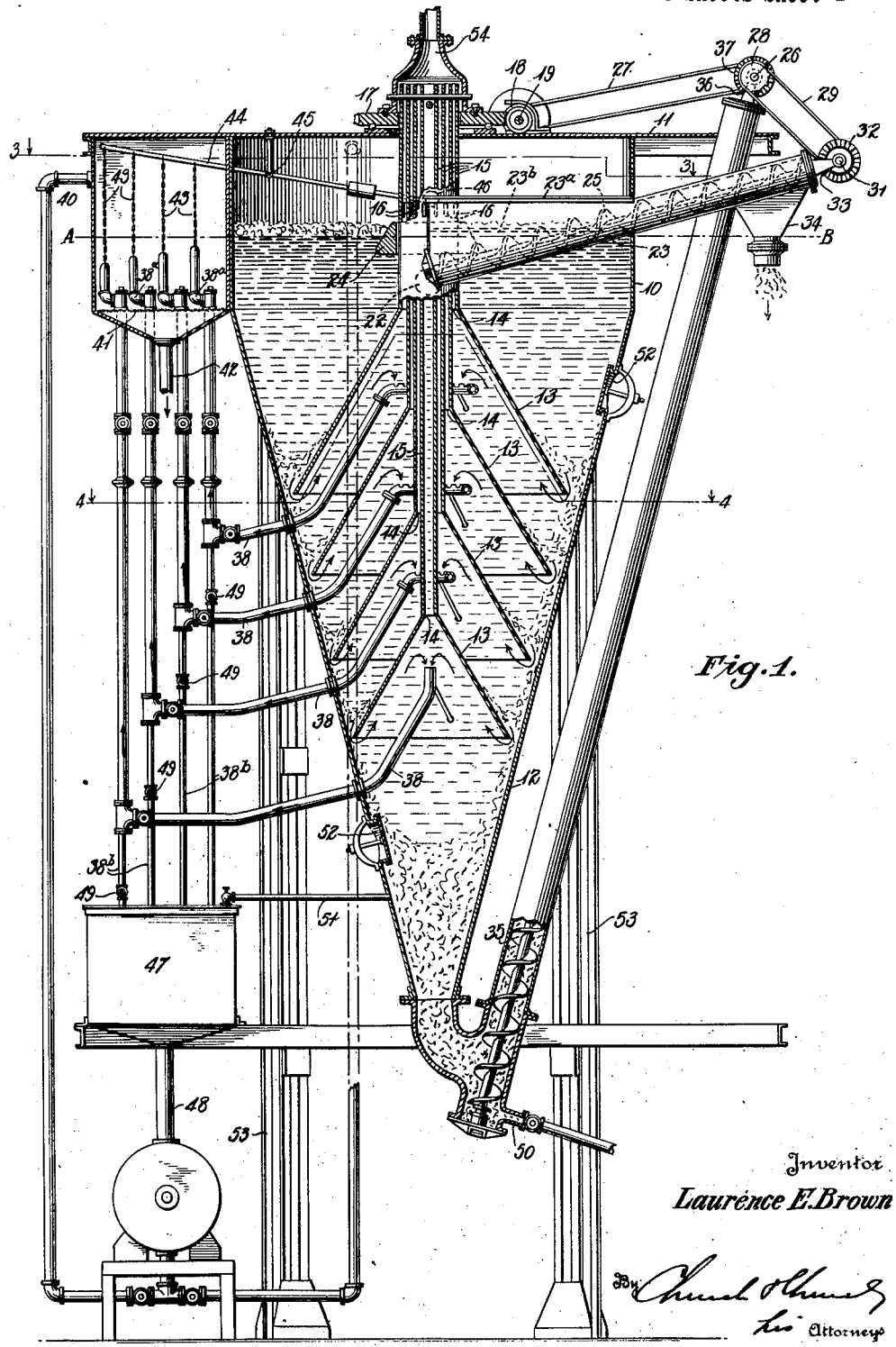
Figure 1 is a vertical sectional view of the preferred embodiment of the apparatus.
Figure 3:
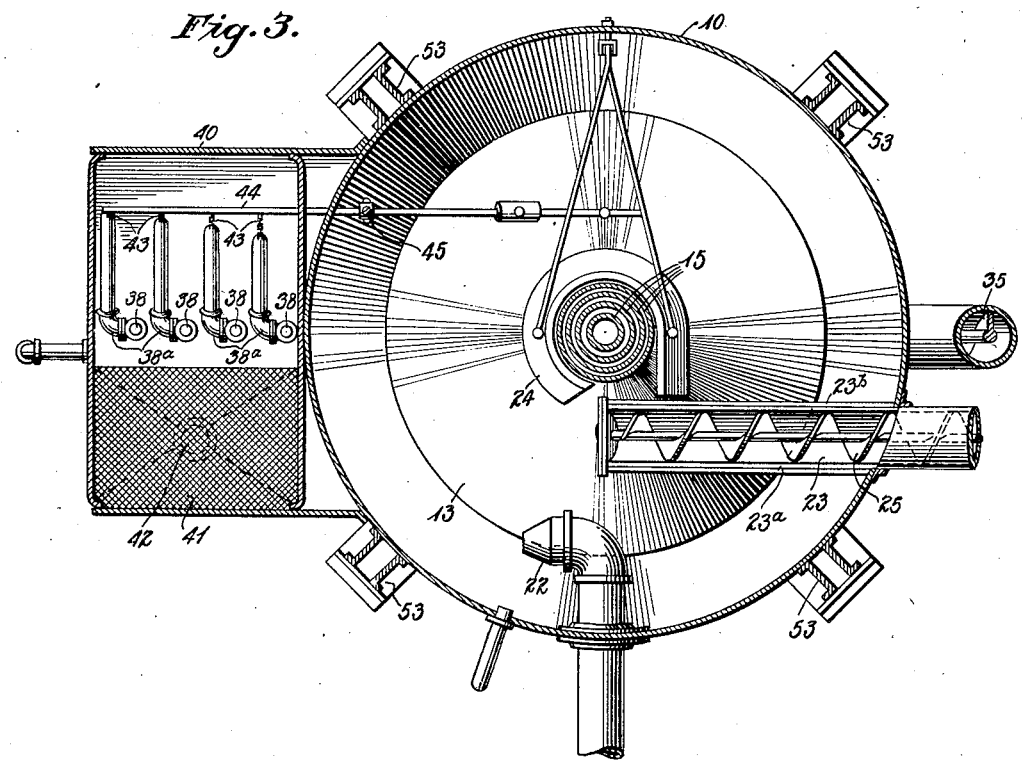
Fig. 3 is a transverse sectional view on the line 3—3 of Fig. 1.
Figure 4:
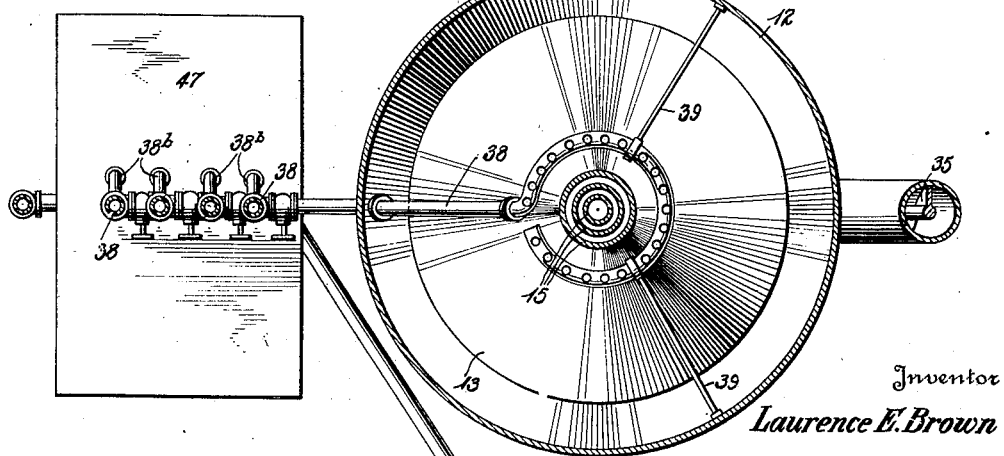
Fig. 4 is a similar view on the line 4—4 of Fig. 1.

While the apparatus embodying the invention is adaptable for use in the clarification of various liquids, the apparatus shown in the present instance has been particularly designed for the defecation of raw cane juice. With this apparatus the heated raw material is separated into a clear juice, the heavier particles called muds and the lighter particles called scums ordinarily contained therein being removed in a more or less concentrated form. The separating tank is preferably composed of a cylindrical upper portion 10 provided with a cover 11 and a rather steep conical base portion 12. In cases where it is not necessary to prevent either the absorption or loss of heat units by the material under treatment, no covering of heat insulating material need be provided on said tank, only the ordinary metal tank being used, as shown. In the interior of the tank there is a series of rotatable members or platforms preferably in the form of funnels or inverted frusto-conical members 13 which are suspended from a point above the tank and arranged axially thereof with their peripheries spaced somewhat from the sides of said tank. These members 13 are adapted to be rotated whereby the heavier particles of foreign matter originally contained in the liquid will be caused to move by centrifugal force toward the side walls of the tank. This rotational movement may be imparted to said members in various ways but it is preferred, for reasons which will later appear, to form an orifice 14 at the center of each member 13 and provide a sleeve 15 extending from each of said orifices to a point above cover 11. These several sleeves 15 are arranged concentrically as shown in Fig. 1 and at their upper end they are connected by suitable means to a worm wheel 17 rotatable on suitable bearings on the cover 11 by means of a worm 18 secured on a shaft 19 which is driven by a prime mover such as the motor indicated at 20. Suitable reduction gearing may be interposed between said shaft 19 and prime mover 20, if desired.

Liquid to be treated is supplied to the tank through an inlet 22 which is in the form, more or less, of a nozzle so arranged as to direct the incoming fluid in a circularly disposed path in the direction in which the members 13 are rotated by the drive mechanism. The normal working level of the liquid in the tank is indicated by the line A—B and when filled to this extent additional liquid coming in will be acted upon by the rotating members 13 in suchwise as to cause a tendency on the part of the heavier particles, even as muds in the treatment of cane juice, to move toward the side walls of the conical portion of the tank. At the same time the weight of the particles is such as to cause them to be gradually precipitated towards the bottom of the tank. During this gravitational movement the downwardly directed upper surfaces of the frusto-conical members 13 will direct such particles downward and toward the walls of the tank, such particles passing between the peripheries of said members and said walls. In the meantime, the lighter particles of foreign matter contained in the liquid, known as scums, will tend to arise in the body of the liquid and accumulate on the surface thereof, It will be seen that the lighter particles move upwardly to the surface of the liquid and the heavier particles during precipitation will move outwardly towards the sides of the tank while the space which is more or less closed by the frusto-conical members will be filled with substantially clarified liquid. In the event any of the lighter particles of matter should pass beneath the frusto-conical members they will be free to rise in the body of liquid within the sleeves 15 extending upwardly from said members and will accumulate therein on the surface of the liquid until they reach a height where they can pass through cut-away portions or openings 16 in said sleeves at a point slightly above the working level of the liquid. The clarified liquid is drawn off from between the several members 13 in a manner which will hereinafter be described.

For removing the scum which accumulates on the surface of the liquid, either by rising directly thereto or by being forced out of the openings in sleeves 15, there is preferably provided a trough 23 extending from a point more or less centrally of the casing 10 and from a point below the working level of the liquid to a point exterior of said casing and to a level above that of the liquid within the tank. One side wall 23$^a$ of said trough extends or projects above the level of the liquid while the opposite side 23$^b$ is cut-away so as to permit the scum to pass over it into contact with the higher wall 23$^a$, it being understood that the direction of movement of the scum, caused by the rotating members 13 and the direction in which the inlet nozzle is pointed, is from the low wall 23$^b$ toward the high wall 23$^a$ of the trough. To prevent any of the scum eddying, so to speak, at the center of rotation of the members 13, means are provided for directing the scum from the central portion into the trough. Such means are preferably in the form of a float 24 which also performs other functions as will later appear. The scum having moved into the trough it is adapted to be carried along the same to the exterior of the casing by the screw arrangement or spiral conveyor 25 and as it is thus carried upwardly along the trough the juice carried by it will be expressed therefrom so that very little, if any, of the juice is carried off and lost. This conveyor is adapted to be rotated by the prime mover 20 through suitable driving connections which may consist of a shaft 26 adapted to be driven by sprocket chain 27 running on sprockets on said shaft and shaft 19, shaft 26 having a second sprocket 28 thereon which is connected by a chain 29 to a sprocket 30 on another shaft 31. This last shaft 31 carries a gear 22 which meshes with a gear 33 mounted on the end of the screw conveyor. As the scum is elevated to the upper exterior extremity of the trough it is deposited in the hopper 34 of a chute by which it may be conveyed to any desired point.

A similar arrangement is also provided for removing the foreign matter precipitated to the bottom of the tank, said tank having a casting at its base into the lower end of which projects a screw conveyor 35. Said conveyor is suitably housed and at its upper end is arranged to deliver the precipitated matter into hopper 34. For rotating the screw conveyor 35 the shaft thereof has a gear 36 which meshes with a driving gear 37 on shaft 26.

When in operation the clarified liquid is drawn from the tank by means of pipes 38 whose ends within the tank are formed with openings located beneath the respective members 13 substantially centrally of the tank. These draw-off pipes are held in position by suitable braces 39. At the exterior of the tank, pipes 38 project upwardly into an overflow box 40 into which they empty the clarified liquid and from which said liquid may flow through a screen 41 and outlet 42 to a suitable receiver. In order that the liquid may flow through the pipes 38 it is, of course, essential that the exterior extremities of the pipes be located below the level A—B of the liquid within the tank. However, to regulate the flow of the liquid through the pipes there is provided an arrangement for varying the height of the exterior extremities of said pipes with respect to the level of the liquid. Preferably, this consists in providing the pipes with pivoted end sections 38$^a$ each connected as by a chain 43 to one end of a lever 44 whose opposite end is connected to the float 24. This lever is pivoted on a suitable fulcrum 45 so that if the level of the liquid within the tank should rise above the normal working level the float will be elevated and the pivoted end sections of the pipes will be lowered. Due to the greater pressure which will thus result there will be a greater flow of liquid from the tank through said pipes, thereby tending to prevent a rise of the liquid in the tank. This would occur where the liquid was being fed into the tank at a greater rate than it was being withdrawn. On the other hand, if the liquid should be withdrawn faster than it was being supplied the level of the liquid would recede whereupon the float 24 would be lowered and the opposite end of the lever 44 would be elevated thereby raising the pivoted end sections of the pipes until they more nearly assume the level of the liquid. In this case there would be a tendency to balance the two columns of liquid and a decreased pressure would result in a retarded withdrawal of liquid from the tank. In this way a substantially constant working level is automatically maintained in the tank. However, should there be an abnormal rise in the liquid which could not be compensated for by the foregoing arrangement the tank is provided with a suitable overflow opening 46 while if the drop in the working level was abnormal the pivoted end sections 38ª of the pipes will be raised to a point above the level of the liquid within the tank and, as a consequence, withdrawal of the liquid would cease.

In starting up the apparatus the lighter solids, as the tank fills up, are drawn off through the perforated pipes 38, but instead of being carried to the discharge point at the pivoted end sections 38ª they are permitted to flow through branches 38ᵇ downwardly to a sump tank 47 having an outlet 48 through which the contents of said tank may be pumped through suitable connections and returned to the inlet 22. After the liquid has begun to run clear into the sump tank it may be pumped from outlet 48 to the overflow box 40. After this stage in the operation has been reached valves 49 in the pipe branches 38ᵇ are closed, whereupon clarified liquid subsequently passing through pipes 38 will flow directly into the overflow box 40, through the pivoted pipe end sections 38ª, as before described.

In order that the separating tank itself may be washed, there is provided near its bottom an outlet 50 through which the liquid used for washing may be drained. Also near the bottom of the tank is a pipe 51 leading to the sump tank 47 for testing the height of the mud in the bottom of the separator. That is, by observing the material or liquid passing through pipe 51 it can be rather accurately ascertained just when the height of scum in tank 40 has reached said pipe because after that height has been reached practically nothing but scum will pass through said pipe. Manholes 52 are also provided in the sides of the tank for entering and cleaning the separator. The apparatus may be supported in any suitable way, ordinary columns 53 being shown in the present instance. In order that any vapors or gases which may be generated within the separator tank may escape, an outlet 54 is provided at the top of the concentrically arranged ducts leading from the members 13.

The following is an example of the operation of the apparatus in the clarifying of cane juice after said apparatus has been filled to the liquid level A—B. The raw juice coming from the heaters (not shown) enters the separator tank at a point above the uppermost member 13 and partakes of a whirling motion within said tank by reason of the disposition of the inlet nozzle 22 and the rotation of the funnel-shaped members 13. Certain of the solids of less specific gravity than the juice, for example, air carrying particles of cellulose, waxes and gums, tend to rise and float on the surface of the liquid and as a result of the whirling motion before mentioned, the scum composed of these substances moves into trough 23 and is caught by the screw conveyor 25 by which it is carried up the inclined trough. During this travel upward along the trough any juice contained in the scum will be expressed therefrom and will drain back into the tank while the substantially dry scum is discharged into the hopper 34 as it reaches the upper extremity of the trough.

Juice and heavier solids pass slowly down through the separator, the solids being kept or caused to travel towards the sides of the tank due to the centrifugal force and by the outwardly flared members 13 which they engage as they gravitate downward. Should any of the lighter particles be drawn down they will rise against the under surfaces of the members 13 and will afterwards gradually rise upwardly through the concentric ducts or sleeves 15 until they reach a point where they will be discharged through the holes 16. They then become a part of the scum on the surface of the liquid and will gradually move into the trough of the screw conveyor 25 which will remove them as before described. The juices occupying the central zone of the separator beneath the several members 13 will be substantially clarified and will be drawn off through the perforated pipes 38 and pipe sections 38ª into the overflow box 40 from whence they will pass through the screen 41 and outlet 42 to a suitable receiver. This flow will be automatically regulated by means of the float actuated lever 44 which raises or lowers the pivoted end sections 38ª in accordance with the rise or fall of the liquid or juice within the separator. The heavier sediment or mud will gradually collect in the bottom of the tank and will be removed by the conveyor 35, any juice carried by such sediment having ample time to be expressed therefrom and drain back into the tank as the sediment travels up to the point at which it is discharged from the casing of said conveyor into the hopper 34.

What I claim is:

1. In a separator having a separating chamber, the combination of a supply connection, a series of rotatable superposed members in said chamber below the normal working level of liquid supplied to the chamber, means for drawing off clarified liquid from beneath each of said members at a point substantially central of the chamber, means for removing foreign matter accumulating on the surface of the liquid in the chamber, and means for removing foreign matter precipitated to the bottom of said chamber.

2. In a separator, the combination of a separating tank, a series of rotatable superposed members in said chamber, means for drawing off clarified liquid from between each adjacent pair of members at a point within the peripheries of said members, means for removing foreign matter from the surface of the liquid in the tank, and means for removing foreign matter precipitated to the bottom of said tank.

3. In a separator, the combination of a tank, a series of rotatable members in said tank, means for rotating said members whereby heavier particles of foreign matter in the liquid will tend to move by centrifugal force to the sides of the tank and be precipitated to the bottom thereof while lighter particles of matter will be free to rise to the surface of the liquid in the tank, means for drawing off clarified liquid from a point substantially centrally of the tank, means for removing foreign matter accumulating on the surface of the liquid in the tank, and means for removing foreign matter precipitated to the bottom of the tank, said removing means comprising troughs in which the foreign matter is moved to a point above the liquid level whereby liquid carried by such matter may drain back into the tank.

4. In a separator, the combination of a tank, a series of rotatable members in said tank, means for rotating said members whereby heavier particles of foreign matter in the liquid will tend to move by centrifugal force to the sides of the tank and be precipitated to the bottom thereof while lighter particles of matter will be free to rise to the surface of the liquid in the tank, means for drawing off clarified liquid from a point substantially centrally of the tank, means for removing foreign matter precipitated to the bottom of said chamber, a trough extending from a point below the surface of the liquid to a point above the surface thereof and terminating on the exterior of the tank, one side of said trough projecting above the surface of the liquid and the other side of said trough being cut away to permit foreign matter on the surface of the liquid to move into the trough, and means for conveying foreign matter in the trough to the exterior of the tank.

5. In a separator, the combination of a tank, a series of rotatable members in said tank, means for rotating said members whereby heavier particles of foreign matter in the liquid will tend to move by centrifugal force to the sides of the tank and be precipitated to the bottom thereof while lighter particles of matter will be free to rise to the surface of the liquid in the tank, means for drawing off clarified liquid from a point substantially centrally of the tank, means for removing foreign matter precipitated to the bottom of said chamber, a trough extending from a point below the surface of the liquid to a point above the surface thereof and extending to the exterior of the tank, one side of said trough projecting above the surface of the liquid and the other side of said trough being cut away to permit foreign matter on the surface of the liquid to move into the trough, means for conveying foreign matter in the trough to the exterior of the tank, and means for preventing the eddying of foreign matter centrally of the surface of the liquid.

6. In a separator, the combination of a tank, a series of rotatable members in said tank, means for rotating said members whereby heavier particles of foreign matter in the liquid will tend to move by centrifugal force to the sides of the tank and be precipitated to the bottom thereof while lighter particles of matter will be free to rise to the surface of the liquid in the tank, means for drawing off clarified liquid from a point substantially centrally of the tank, means for removing foreign matter precipitated to the bottom of said chamber, a trough extending from a point below the surface of the liquid to a point above the surface thereof and terminating on the exterior of the tank, one side of said trough projecting above the surface of the liquid and the other side of said trough being cut away to permit foreign matter on the surface of the liquid to move into the trough, means for conveying foreign matter in the trough to the exterior of the tank, a float member centrally located on the surface of the liquid to prevent eddying of foreign matter at that point, and means operable by said float controlling the flow of liquid out of the tank.

7. In a separator, a tank having a conical base portion, means for supplying liquid to the tank, a series of inverted frusto-conical members in said tank and spaced from the walls thereof, means for drawing off clarified liquid from between each adjacent pair of said members at a point substantially central transversely of the tank, and means for removing foreign matter accumulating on the surface of the liquid and in the bottom of said tank.

8. In a separator, the combination of a tank, a supply connection for delivering liquid to the tank, a series of rotatable superposed members in said tank located below the supply connection, each of said members having a duct leading from its under surface to a point above the liquid level, means for drawing off clarified liquid from beneath each of said members, means for removing foreign matter from the surface of the liquid and means for removing foreign matter precipitated to the bottom of said chamber.

9. In a separator, the combination of a tank having a conical base portion, means for supplying liquid to said tank, a series of superposed inverted frusto-conical members in the tank and adapted to be submerged in the liquid therein, a sleeve extending from an opening at the center of each of said members to a point above the surface of the liquid at which latter point each sleeve is provided with an orifice whereby comparatively light particles of foreign matter may pass from beneath each member upwardly through the sleeves and through said orifices on to the surface of the liquids, means for rotating said frusto-conical members whereby comparatively heavy particles of matter will tend to move to the sides of the tank and be precipitated to the bottom thereof, means for removing foreign matter collecting on the surface of the liquid and in the bottom of the tank, and means for withdrawing clarified liquid from the tank at a point adjacent said frusto-conical members.

10. In a separator, the combination of a tank having a conical base portion, means for supplying liquid to said tank, a series of superposed inverted frusto-conical members in the tank adapted to be submerged in the liquid therein, concentrically arranged conduits leading from openings in said frusto-conical members to a point above the liquid level in the tank, said conduits having openings therein above the level of the liquid whereby comparatively light particles of foreign matter may pass from beneath each member upwardly through the sleeves and through said orifices on the surface of the liquids, means for rotating said frusto-conical members whereby comparatively heavy particles of matter will tend to move to the sides of the tank and be precipitated to the bottom thereof, means for removing foreign matter collecting on the surface of the liquid and in the bottom of the tank, and means for withdrawing clarified liquid from the tank at a point adjacent said frusto-conical members.

11. In a separator, the combination of a tank having a separating chamber, means for supplying liquid to said chamber, a plurality of rotatable members in said chamber, means for rotating said members, said members being adapted to be submerged in the liquid in the tank, whereby lighter particles of foreign matter may rise to the surface of the liquid while heavier particles will tend to move toward the bottom of the chamber, means for permitting lighter particles to rise from beneath said members to the surface of the liquid, means for removing from said chamber foreign matter accumulating in the bottom thereof and on the surface of the liquid, and means for withdrawing clarified liquid from said chamber.

12. In a separator, the combination of a tank having a separating chamber, means for supplying liquid to said chamber, a plurality of frusto-conical members in said chamber adapted to be submerged in the liquid, means for rotating said means, ducts through which comparatively light particles of foreign matter trapped beneath said members may pass to the surface of the liquid, means for drawing off clarified liquid from beneath each of said members, and means for removing from said chamber foreign matter precipitated to the bottom thereof and foreign matter accumulated on the surface of the liquid.

13. In a separator, the combination of a tank, means for supplying liquid thereto, a series of superposed members adapted to be submerged in the liquid in the tank, means for rotating said members, means for removing foreign matter collecting on the surface of the liquid, means for removing foreign matter precipitated to the bottom of the tank, means for withdrawing clarified liquid from beneath each of said superposed members, a float on the surface of the liquid, and means operable by said float for preventing withdrawal of liquid upon the level of the liquid receding to a predetermined point.

14. In a separator, the combination of a tank, means for supplying liquid thereto, a series of superposed members adapted to be submerged in the liquid in the tank, means for rotating said members, means for removing foreign matter collecting on the surface of the liquid, means for removing foreign matter precipitated to the bottom of the tank, a pipe having an opening therein located between each two adjacent members, said pipes extending to the exterior of the tank and terminating at a point normally below the level of the liquid within the tank, and means for elevating the terminals of said pipes as the level of the liquid recedes within the tank.

15. In a separator, the combination of a tank, means for supplying liquid thereto, a series of superposed members adapted to be submerged in the liquid in the tank, means for rotating said members, means for removing foreign matter collecting on the surface of the liquid, means for removing foreign matter precipitated to the bottom of the tank, a pipe having an opening therein located between each two adjacent members, said pipes extending to the exterior of the tank and terminating in pivoted end sections having discharge openings located below the normal working level of the liquid in the tank, and means for rocking said pivoted pipe end sections to elevate the same as the level of the liquid in the tank is lowered.

16. In a separator, the combination of a tank, means for supplying liquid thereto, a series of superposed members adapted to be submerged in the liquid in the tank, means for rotating said members, means for removing foreign matter collecting on the surface of the liquid, means for removing foreign matter precipitated to the bottom of the tank, a pipe having an opening therein located between each two adjacent members, said pipes extending to the exterior of the tank and terminating in pivoted end sections having discharge openings located below the normal working level of the liquid in the tank, a float within said tank, and connections between said float and pivoted end sections of the pipes for raising and lowering said end sections as the level of the liquid within the tank varies.

LAURENCE E. BROWN.